(12) United States Patent
Cook et al.

(10) Patent No.: US 9,284,053 B2
(45) Date of Patent: Mar. 15, 2016

(54) HELICOPTER EQUIPMENT MOUNTING POST

(71) Applicant: Airbus Helicopters, Inc.

(72) Inventors: Drew O'Brien Cook, Keller, TX (US); Korey Lynn Bush, Ft. Worth, TX (US)

(73) Assignee: Airbus Helicopters, Inc., Grand Prairie, TX (US)

( * ) Notice: Subject to any disclaimer, the term of this patent is extended or adjusted under 35 U.S.C. 154(b) by 10 days.

(21) Appl. No.: 14/248,070

(22) Filed: Apr. 8, 2014

(65) Prior Publication Data
US 2015/0284081 A1 Oct. 8, 2015

(51) Int. Cl.
B64D 7/00 (2006.01)
B64D 7/06 (2006.01)
F41A 23/18 (2006.01)
B60R 7/14 (2006.01)

(52) U.S. Cl.
CPC ... *B64D 7/06* (2013.01); *B60R 7/14* (2013.01); *F41A 23/18* (2013.01)

(58) Field of Classification Search
CPC .............. B64D 7/00; B64D 7/06; B64D 7/04; F41A 23/02; F41A 23/18
See application file for complete search history.

(56) References Cited

U.S. PATENT DOCUMENTS

| | | |
|---|---|---|
| 5,419,234 A | 5/1995 | Sanderson |
| 5,517,895 A | 5/1996 | Sanderson |
| 5,767,436 A | 6/1998 | Sanderson et al. |
| 6,250,197 B1 | 6/2001 | Sanderson |
| 7,258,055 B1 | 8/2007 | Javorsky |
| 7,543,524 B1 | 6/2009 | Javorsky |
| 7,958,813 B1 | 6/2011 | Serkland et al. |
| 8,209,896 B1 * | 7/2012 | Cashwell ................ 42/94 |
| 8,434,397 B1 | 5/2013 | Deckard et al. |
| 2011/0089647 A1 * | 4/2011 | Peterson et al. ........ 280/6.157 |
| 2011/0209603 A1 | 9/2011 | Serkland et al. |
| 2013/0000477 A1 | 1/2013 | Larue |
| 2014/0157643 A1 * | 6/2014 | Tucker et al. ............ 42/94 |

* cited by examiner

Primary Examiner — Valentina Xavier
(74) Attorney, Agent, or Firm — Locke Lord LLP

(57) ABSTRACT

The invention relates to a mounting post that can be selectively installed in a helicopter or other aircraft in order to support a tactical weapon or other equipment and removed when not required so as to free up additional passenger and/or cargo space. Preferably the mounting post can be quickly installed and removed without requiring the use of any tools. An elongated post having one or more T-track along its length is slid through an opening in an aircraft panel, such as the floor, and slid into a bracket with corresponding T-rails. A stop is used to limit further movement of the post through the bracket and a latch is used to selectively allow the post to be removed.

26 Claims, 4 Drawing Sheets

HELICOPTER EQUIPMENT MOUNTING POST

BACKGROUND

1. Field of the Invention

This invention generally relates to a post for use in securing a gun and/or other equipment inside the cabin of helicopters and other aircraft and more particularly to a post that can be easily removed when not in use.

2. Description of Related Art

It is often necessary to secure equipment, such as a firearm, inside the cabin of an aircraft. In particular, helicopters are often used by various law enforcement agencies as well as various branches of the military. On some occasions it is necessary or desirable to have a rifle, other type of firearm, or other equipment safely secured in the cabin. At the same time, the firearm or other equipment often needs to be easily accessible so that it can be quickly removed as needed. One example of such a scenario is the frequent use of tactical weapons that are secured in the cabin of police helicopters.

This need has been often met through the use of various types of quick-release brackets that attach to the floor or wall inside an aircraft cabin. One such common bracket system is the line of tactical weapon racks manufactured under the BLAC-RAC® trademark that are available from Blac-Rac Mfg. located in Meridian, Id. The bracket is typically permanently attached to the floor or wall of the cabin. While these types of brackets provide convenient access to the firearm or other equipment, they generally have a significant drawback in that they reduce the cabin passenger and/or cargo capacity regardless of whether there is a specific need for the firearm or other equipment for which it was intended. The United States Federal Aviation Administration (FAA) has strict requirements for clearances required around seats in aircraft such as helicopters. The counterpart agencies to the FAA in other countries have similar requirements. These requirements are in place in order to minimize the possibility that a passenger in the cabin might hit their head or another portion of their body against the structure in turbulence or in the event of a hard or crash landing. As a result, in a helicopter the installation of a bracket in order to secure equipment such as a tactical weapon in the cabin often results in the loss of the ability to use one or more seats for passengers. While this may be an acceptable trade-off during periods when the tactical weapon or other equipment is required in the helicopter or other aircraft, it can present an unnecessary restriction during trips or missions where the tactical weapon or other equipment is not required.

The bracket must also satisfy additional FAA requirements requiring the structure to be able to withstand the expected loads in all directions that it could conceivably experience not only during regular operation but also during turbulence or in the event of a hard or crash landing without deforming or breaking in a way that might create a hazard for the aircraft or its occupants. Similarly, the attachment of the bracket or other structure must not be done in a way that could negatively impact the structural integrity or safety factor of any of the other components of the helicopter or other type of aircraft.

This need to have the equipment mounting post adequately secured to the helicopter or other aircraft has generally led to the use of attachment mechanism such as rivets and bolts to secure the post directly to one or more structural beams of the helicopter or other aircraft. These structural beams provide a more secure attachment point for the mounting post, however, they are generally not exposed in the cabin. Instead, they are located underneath the floor or behind the walls of the cabin. As a result, it is often difficult to gain sufficient access to be able to attach or remove such equipment mounting posts. This may require removing floor panels or cowlings that are often riveted to the airframe. Once access is obtained, specialized tools such as wrenches are required to be able to detach the mounting post from the airframe. As a result, in order to remove conventional mounting posts from a helicopter or other aircraft it may be necessary to take the aircraft out of service for, in some cases, hours and require a mechanic.

Thus, there is a need for an equipment mounting post or other structure that is securely attached to the frame of a helicopter or other aircraft and yet can be quickly and easily removed from the helicopter from inside the cabin without tools so that one or more additional passengers can be seated inside the cabin during periods when the tactical weapon or other equipment is not required.

BRIEF DESCRIPTION OF THE INVENTION

The invention relates to a mounting post that can be selectively installed in a helicopter or other aircraft in order to support a tactical weapon or other equipment and removed when not required so as to free up additional passenger and/or cargo space. Preferably the mounting post can be quickly installed and removed without requiring the use of any tools. An elongated post having one or more T-track along its length is slid through an opening in an aircraft panel, such as the floor, and slid into a bracket with corresponding T-rails. A stop is used to limit further movement of the post through the bracket and a latch is used to selectively allow the post to be removed.

BRIEF DESCRIPTION OF FIGURES

For a more complete understanding of the present invention and for further advantages thereof, reference is now made to the following description taken in conjunction with the accompanying drawings in which.

DESCRIPTION OF THE PREFERRED EMBODIMENTS

The present invention can be better understood by the following discussion of the manufacture and use of certain preferred embodiments.

In a preferred embodiment, a removable equipment mounting post is used to selectively secure a tactical weapon inside the cabin of a helicopter. The components of the preferred equipment mounting post can be made of any material that provides the necessary strength and other properties to be able to support the desired equipment as well as satisfy the requirements of the FAA. It is particularly preferred that the components are made of a metal such as steel or aluminum. The components can be formed using any known process, including but not limited to stamping, molding, extrusion, or hydroforming. All or select components may also include anodizing, a coating, such as a protective anticorrosion coating, or a rubber or polymeric coating. One of skill in the art will recognize that one or more of the individual elements of the invention can be composed of multiple pieces or multiple elements can be combined into a single component as desired.

Figure 1:
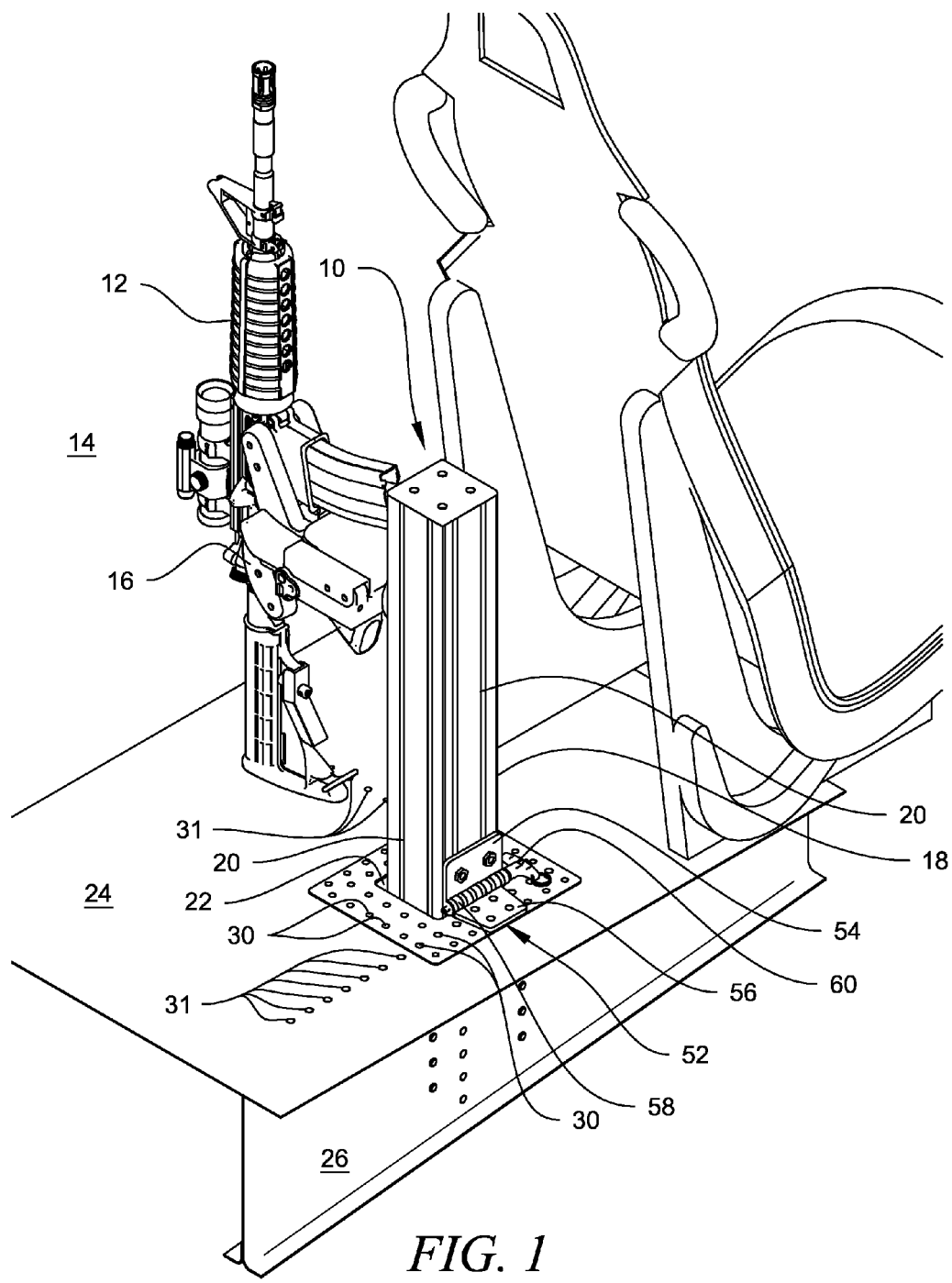
FIG. 1 is a perspective view of a removable gun mount post that is a preferred embodiment of the current invention.
Figure 2:
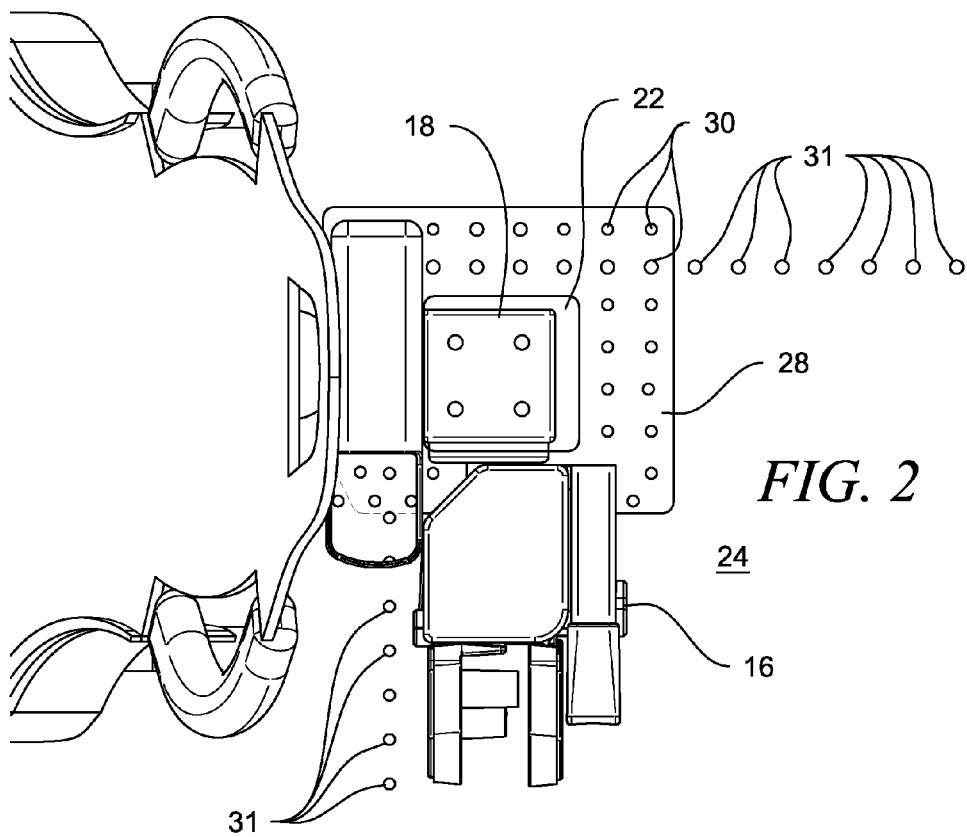
FIG. 2 is a top view of the embodiment depicted in FIG. 1.
Figure 4:
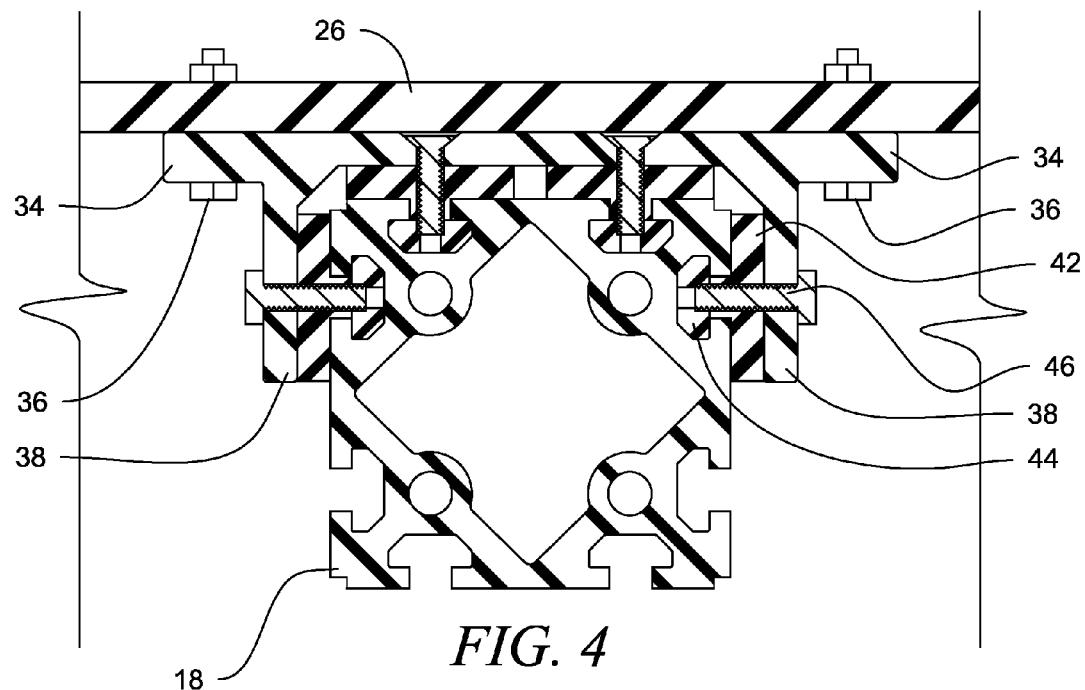
FIG. 4 is a cross-sectional view of the embodiment depicted in FIG. 3, taken along line 4-4.

A preferred embodiment of the current invention can be seen in FIG. 1, which depicts an equipment mounting post 10 being used in a typical helicopter cabin 14 such as would be used by a law enforcement agency. A tactical weapon 12 is securely mounted to the equipment mounting post 10 inside the helicopter cabin 14 using a quick mount bracket 16 attached to post 18. Preferably post 18 is a rectangular or square post having at least two T-tracks 20 running along the length of each side. Depending upon the strength and weight requirements, post 18 may be solid with T-tracks 20 machined therein or can be hollow where the sides of post 18 are shaped so as to form the T-tracks 20. Particularly preferred is a hollow honeycomb-like cross section such as depicted in FIG. 4 to form a post with an approximately three inch square cross section.

The term T-track is intended to refer to a channel that has a width that is narrower at the surface of the post then at some point further away from the surface such that a correspondingly shaped T-rail can be slidingly received in the T-track without being able to be pulled out of the channel by a force that is normal to the surface of the post. This includes but is not limited to the standard T-track as shown in the figures that has a T shaped cross section with the bottom of the "T" shaped channel at the surface of the post. Alternatively, the sides of the "T" can be located at a point other than the bottom of the channel, thus forming more of a "+" cross-section. The portions extending from the central channel can also be of differing shapes. Another alternative is a trapezoidal cross-section with the narrow side of the trapezoid located at the surface of the post. Similarly, the term T-rail is intended to refer to a projection that corresponds to the cross-section of the T-track and may be formed in shapes other than a "T" cross section. The important feature of the T-track 20 is that it allows a corresponding T-rail 48 to slide back and forth along the channel while preventing the T-rail 48 from being pulled out of the channel by a force (or component of a force) that is normal to the surface of the post.

Quick mount bracket 16 can be secured to post 18 using bolts (not shown) where the heads of the bolts are sized to slide in the T-tracks of post 18. It is particularly preferred to use a conventional quick release bracket 16 such as the BLAC-RAC® 1070/1080, which is available from Blac-Rac Mfg. located in Meridian, Id. Different or additional brackets can similarly be secured to post 18 via the T-tracks on each side so as to allow various types of equipment to be secured to the post during flight.

Post 18 passes through an opening 22 in the cabin floor 24 so that it is detachably secured to beam 26 located beneath floor 24 of cabin 14. Opening 22 is the same shape and slightly larger than the cross section of post 18 to facilitate the passage of post 18. A reinforcement plate 28 preferably surrounds opening 22. Reinforcement plate 28 can provide additional structural support to the floor 24 in light of the formation of opening 22. In another embodiment, reinforcement plate 28 can be larger then shown in FIG. 1 and include an integrated cargo tie down ring or cleat to allow additional equipment to be secured to the floor 24 of cabin 14. Reinforcement plate 28 has a series of holes 30 that are used to secure reinforcement plate 28 to floor 24 of cabin 14. Preferably, one or more lines of holes 30 line up with rivets 31 that are used to secure floor 24 to support beam 26 and/or other support beams located underneath floor 24. Thus, a single line of rivets 31 can be used to both secure reinforcement plate 28 to floor 24 as well as floor 24 to support beam 26. Preferably at least eight spaced apart rivets 31 are used to secure reinforcement plate 28 to floor 24.

Figure 3:
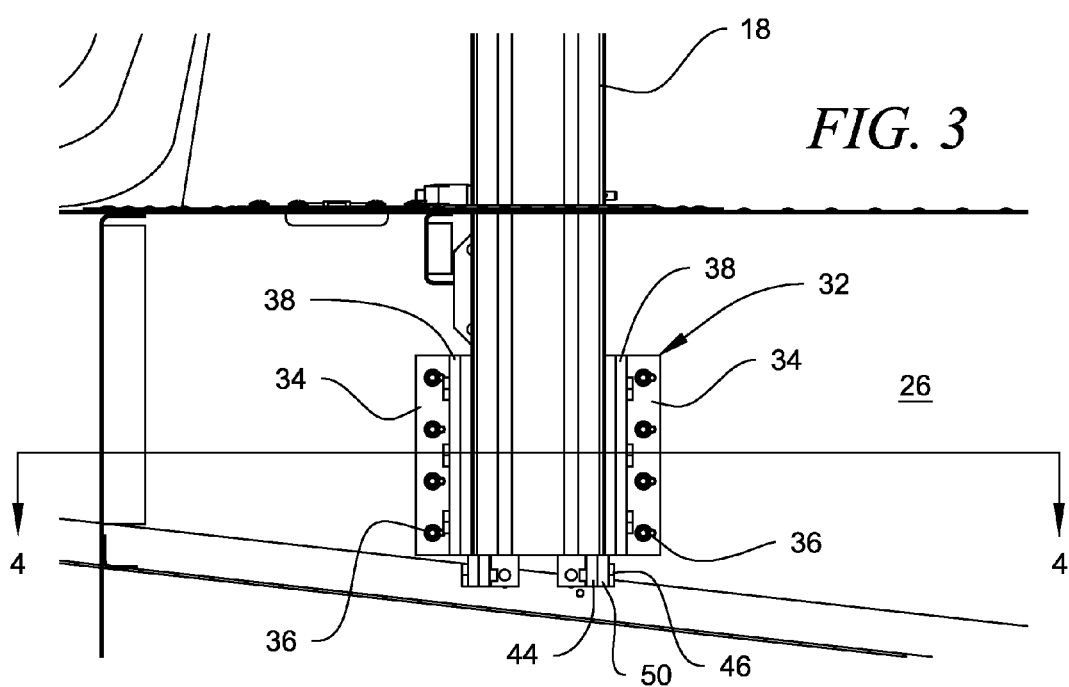
FIG. 3 is a side elevation view of the embodiment depicted in FIG. 1.

As can be seen in FIG. 3, post 18 is secured to support beam 26 with a bracket 32. Bracket 32 has a base 34 that is secured to support beam 26 using fasteners 36 such as rivets or bolts. The structure of the bracket 32 can be better seen in FIGS. 4 and 5. Bracket 32 has two sides 38 that extend away from the base 34 to form a channel 40 that corresponds to the size and shape of the cross section of the post 18. There are two T-rails 48 running vertical along the base 34 of the bracket 32 with an additional T-rail 48 running vertical along each of the sides 38. In the preferred embodiment, each T-rail 48 is composed of a spacer 42 and a nut rail 44. Bolts 46 pass through openings in the bracket 32 and spacer 42 and are threaded into openings in the nut rail 44 in order to secure T-rail 48 together and to bracket 32. Preferably at least 8 bolts are used to secure bracket 32 to beam 26 and bracket 32 is at least approximately four and a half inches high. This allows an approximately twenty-six inch high post 18 to be adequately secured to beam 26 and support up to about fifty pounds of equipment and still have a sufficient safety margin even under conditions that could result in loads up to 4 G's.

Figure 5:
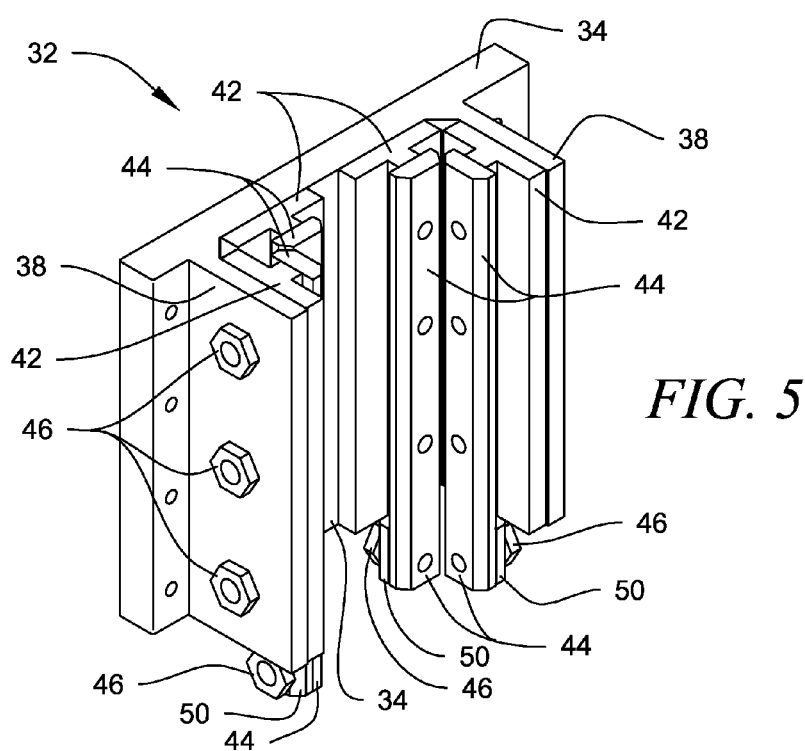
FIG. 5 is a perspective view of the bracket from the embodiment depicted in FIG. 1.
Figure 6:
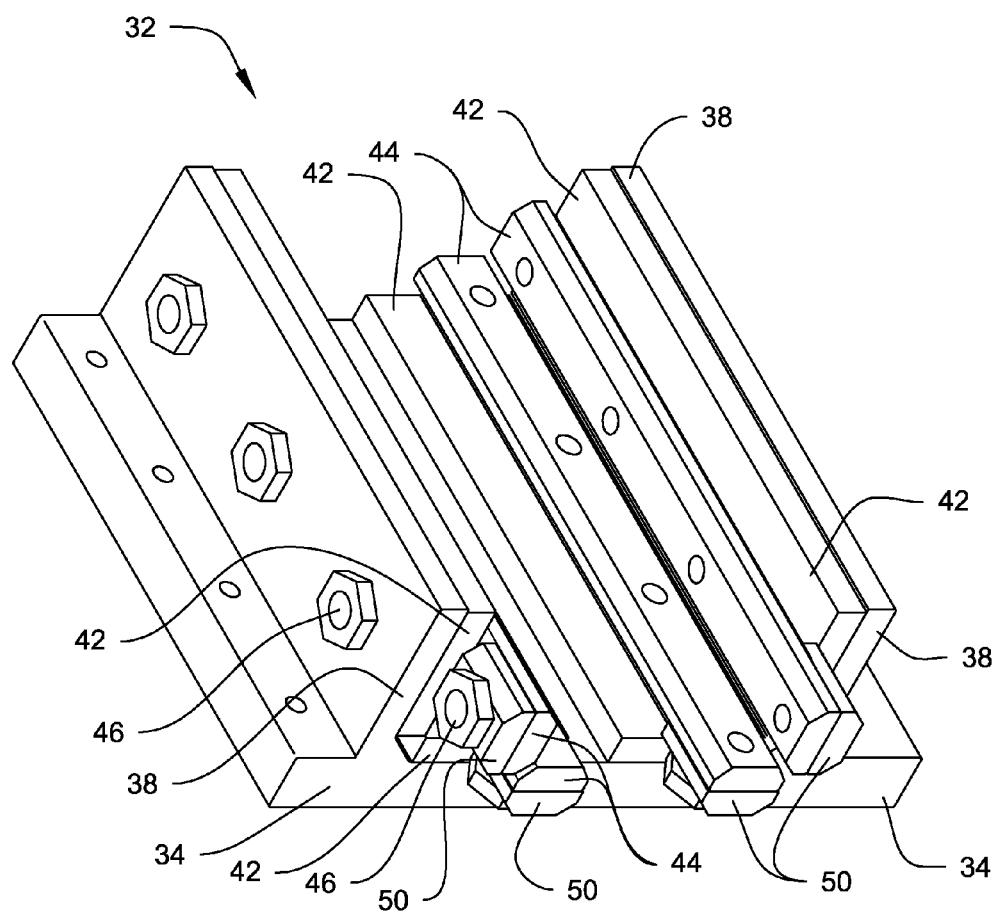
FIG. 6 is a second perspective view of the bracket depicted in FIG. 5 showing the stops located at the bottom of the T-rails.

As can be better seen in FIGS. 3 and 5-6, nut rails 44 extend below the bottom of bracket 32. Below the bottom of the bracket 32, an additional bolt 46 threads through a stop piece 50 and threads into the bottom hole of the nut rail 44. Stop piece 50 contacts the bottom of post 18 when it is inserted into bracket 32 and prevents post 18 from sliding further down below floor 24.

The fit between the T-rail 48 and T-track 20 should be loose enough to allow the post 18 to easily slide into position in bracket 32 while also being tight enough to avoid wobbling or deflection from side to side once installed. In the preferred embodiment, this can be accomplished by slightly tapering spacer 42 and/or nut rail 44 of T-rail 48 so that it is slightly larger at the bottom of bracket 32 as compared to the top. Alternatively, a lower portion of the spacer 42 or nut rail 44 can be made wider or thicker or a coating or other material added to the lower portion so as to provide the desired frictional fit as the post 18 slides into place in bracket 32. This would allow the T-tracks 20 to easily slide over the majority of the T-rail 48 while creating a frictional fit between the T-track 20 and T-rail 48 as the post 18 slides into its final position. It is also possible to either slightly taper or add material or a coating to the interior of one or more T-tracts 20 on post 18 at a location where the end of the T-tract 20 easily slides over the T-rail 48 but the T-tract 20 frictionally engages the T-rail 48 as it fully seats in the bracket 32.

Post 18 is preferably secured in place in a manner that allows it to be quickly and easily removed when not required to secure the tactical weapon 12 or other equipment in the cabin 14 of a helicopter or other aircraft. As can be seen in FIG. 1, this can be accomplished by using a hinge 52. A top leaf 54 of hinge 52 is attached to the side of post 18 and a bottom leaf 56 is attached to reinforcement plate 28 such that when post 18 is fully seated in bracket 32 the barrel 58 of the top leaf 54 aligns with the barrel 58 of the bottom leaf 56. A removable pin 60 having a handle can then be inserted through the barrel 58 of both top leaf 54 and bottom leaf 56 to prevent post 18 from sliding out of bracket 32. When post 18 is not required, removable pin 60 can be easily removed to allow post 18 to be slid out of bracket 32 and removed. This allows post 18 to be selectively installed or removed in cabin 14 quickly and without the need to use any tools or require any parts to be dissembled or removed in order to provide access to the bracket 32 located below floor 24 of cabin 14. Hinge 52 is preferably located on one of the two sides of post 18 instead of the front or back in order to minimize torsional loads on the hinge 52 and removable hinge pin 60. While the preferred embodiment uses hinge 52 to secure post 18 into place in bracket 32, any structure that serves to minimize or prevent the post 18 from sliding out of bracket 32 until the user desires to remove post 18 can be used. For example, the upper leaf can be replaced with a hole in post 18 such that removable pin 60 slides through both a sleeve or bracket corresponding to the lower leaf and at least partially into the hole in post 18 to prevent it from being removed. Other latch-type structure that provides a structure directly or indirectly attached to the floor 24 having a first shoulder and another structure directly or indirectly attached to the post with a second shoulder where the two shoulders can be selectively aligned so that they abut to prevent post 18 from being removed or do not abut to allow post 18 to be removed can be used. Those of skill in the art will be able to determine other types of latch structures that can be used to selectively prevent post 18 from being removed from bracket 32.

When post 18 is not installed in cabin 14 a cover plate 62 can be used to cover opening 22 in floor 24. Cover plate 62 can be secured in place in any desired manner that allows it to be selectively removed, including but not limited to by being screwed to the reinforcement plate 28, having one or more extension or spring clips on the bottom that frictionally seats in the opening 22 in the floor 24, or having a combination of a hook that hooks under the reinforcement plate 28 or opening 22 in the floor 24 on one side and structure similar to top hinge leaf 54 that has a barrel 58 that aligns with barrel 58 of bottom leaf 56 such that removable pin 60 can be used to secure cover plate 62 in place as well. Cover plate 62 need only be secured in place sufficiently to prevent occupants or objects in cabin 14 from falling into opening 22 in floor 24 or catching on the edge of reinforcement plate 28. As a result, only the barrel 58 of lower hinge 56 is protruding above the floor 24 to any measurable extent. This allows, passengers and equipment to easily pass over the location where post 18 can be installed without presenting a measureable trip hazard do to the presence of brackets or other structure that is secured to the top of floor 24 in order to adequately secure post 18 in place.

The removable gun mount 10 of the preferred embodiment can be easily incorporated into both new helicopters or aircraft as well as be easily retrofitted into existing helicopters or aircraft. For existing helicopters, all that is required is one-time access to the beam 26 that runs underneath the floor 24 of cabin 14 to be able to install bracket 32 using fasteners 36. This can be accomplished by removing a panel of floor 24. Alternatively, access can be obtained by temporarily removing the lower faring of the helicopter to gain the required access to beam 26. Opening 22 can be cut in a panel of floor 24 adjacent to the location of beam 26. Preferably, a number of rivets securing floor 24 to beam 26 are drilled out and then replaced with rivets that also secure reinforcement plate 28 to floor 24 as well as floor 24 to beam 26 using the same line of rivet holes. Holes can also be drilled in floor 24 to accommodate additional rivets used to adequately secure reinforcement plate 28 to floor 24.

The above descriptions of certain embodiments are made for the purpose of illustration only and are not intended to be limiting in any manner. Other alterations and modifications of the invention will likewise become apparent to those of ordinary skill in the art upon reading the present disclosure, and it is intended that the scope of the invention disclosed herein be limited only by the broadest interpretation of the appended claims to which the inventors are legally entitled.

What is being claimed is:

1. A mounting post in an aircraft cabin comprising:
   an elongated post having a length and a cross section;
   at least one T-track channel located longitudinally along the length of the post;
   a bracket adapted to be secured to a support beam located behind a panel in the aircraft cabin and near an opening in the panel that corresponds to the cross-section of the elongated post;
   wherein the bracket has a channel that at least partially corresponds to the cross-section of the elongated post;
   at least one T-rail extending from the bracket into the channel wherein each T-rail has a size, shape and location adapted to slide into one of the at least one T-track on the post;
   at least one stop adapted to contact the elongated post and prevent further movement of the post through the channel; and
   a latch comprising a first portion on the post and a second portion adapted to be secured to the panel, wherein the latch is adapted to selectively prevent the elongated post from being removed from the bracket.

2. The post of claim 1 wherein:
   the elongated post has a polygonal cross-section; and
   there is at least one T-tract located on each side of the elongated post.

3. The post of claim 1 wherein the cabin has a floor and the panel is the floor of the cabin.

4. The post of claim 1 wherein there is at least three T-track channels on the post and at least three T-rails on the bracket.

5. The post of claim 1 wherein the stop is at a bottom of the bracket and contacts the elongated post to prevent further movement of the post through the channel.

6. The post of claim 5 wherein the stop is at a bottom of at least one of the T-rails.

7. The post of claim 1 wherein the at least one stop is a widening of at least one of the T-rails near a bottom of the bracket such that the widened T-rail frictionally engages the interior of the T-track to prevent further movement of the elongated post through the channel.

8. The mounting post of claim 1 further comprising a reinforcing plate having an opening corresponding to the cross-section of the elongated post and adapted to be secured to the panel around the opening in the panel.

9. The post of claim 1 wherein the first portion of the latch is attached to the post and has a first shoulder, the second portion has a second shoulder and further comprising a member that selectively contacts both shoulders to prevent the elongated post from being removed from the bracket.

10. The mounting post of claim 1 wherein the first portion of the latch comprises a first sleeve and the second portion of the latch comprises a second sleeve and further comprising a pin that is selectively removable from the first and second sleeves.

11. The mounting post of claim 10 wherein the panel is a floor of the helicopter cabin, the first portion is a hinge leaf attached to the elongated post, the second portion is a second hinge leaf adapted to be attached to the floor, and the pin is a removable hinge pin.

12. The mounting post of claim 11 further comprising:
   a reinforcing plate having an opening corresponding to the cross-section of the elongated post and adapted to be secured to the floor around the opening in the floor; and wherein the second hinge leaf is adapted to be indirectly attached to the floor by being adapted to be attached to the reinforcing plate.

13. A mounting post for use in securing a weapon or equipment in a helicopter cabin having a floor comprising:
- an elongated post having a length and a rectangular cross-section;
- at least one T-track channel located longitudinally along the length of at least three sides of the post;
- a bracket having a base and two sides extending from the base to form a channel that at least partially corresponds to the cross-section of the elongated post, wherein the bracket is adapted to be secured to a support beam located below the floor near an opening in the floor that corresponds to the cross-section of the elongated post;
- at least one T-rail extending inward from the base and each side of the bracket, wherein each T-rail has a size, shape and location adapted to each slide into a T-track on the post;
- at least one stop adapted to contact the elongated post and prevent further downward movement; and
- a latch comprising a first portion on the post and a second portion on the floor, wherein the latch is adapted to selectively prevent the elongated post from being removed from the bracket.

14. The mounting post of claim 13 wherein the elongated post has two T-track channels located longitudinally along the length of at least three sides.

15. The mounting post of claim 13 wherein the bracket has two T-rails located on the base and each side of the bracket.

16. The mounting post of claim 13 wherein the elongated post has a square cross-section.

17. The mounting post of claim 13 wherein the at least one stop is at a bottom of one or more of the T-rails on the bracket.

18. The mounting post of claim 13 wherein the at least one stop is a widening of at least one of the T-rails near a bottom of the bracket such that the widened T-rail frictionally engages an interior of the T-track to prevent further downward movement of the elongated post.

19. The mounting post of claim 13 further comprising a reinforcing plate having an opening corresponding to the cross-section of the elongated post and adapted to be secured to the floor around the opening in the floor.

20. The mounting post of claim 13 wherein the first portion of the latch is attached to the post and has a first shoulder, the second portion has a second shoulder and further comprising a member that selectively contacts both shoulders to prevent the elongated post from being removed from the bracket.

21. The mounting post of claim 13 wherein the first portion of the latch comprises a first sleeve and the second portion of the latch comprises a second sleeve and further comprising a pin that is selectively removable from the first and second sleeves.

22. The mounting post of claim 13 wherein the first portion is a hinge leaf attached to the elongated post, the second portion is a second hinge leaf adapted to be attached to the floor, and further comprising a removable hinge pin.

23. The mounting post of claim 22 further comprising:
- a reinforcing plate having an opening corresponding to the cross-section of the elongated post and adapted to be secured to the floor around the opening in the floor; and
- wherein the second hinge leaf is adapted to be indirectly attached to the floor by being adapted to be attached to the reinforcing plate.

24. The mounting post of claim 23 wherein:
- the elongated post has two T-track channels located longitudinally along the length of at least three sides;
- the bracket has two T-rails located on the base and each side of the bracket;
- the elongated post has a square cross-section; and
- the at least one stop is attached to a bottom of one or more of the T-rails on the bracket.

25. The mounting post of claim 21 wherein at least one of the T-rails widens near a bottom of the bracket such that the widened T-rail frictionally engages an interior of the T-track.

26. A mounting post for use in securing a weapon or equipment in a helicopter cabin having a floor comprising:
- an elongated post having a length and a rectangular cross-section;
- at least one T-track channel means located longitudinally along the length of at least three sides of the post;
- a bracket having a base and two sides extending from the base to form a channel that at least partially corresponds to the cross-section of the elongated post, wherein the bracket is adapted to be secured to a support beam located below the floor near an opening in the floor that corresponds to the cross-section of the elongated post;
- at least one T-rail means to slide into a T-track on the post;
- a stop means to prevent further movement of the post through the channel; and
- a latch means to selectively prevent the elongated post from being removed from the bracket.

* * * * *